United States Patent [19]

Leverett

[11] Patent Number: 5,267,654
[45] Date of Patent: Dec. 7, 1993

[54] ARTICLE-HOLDING CUP AND SORTING APPARATUS

[75] Inventor: William H. Leverett, Greenville, Ga.

[73] Assignee: Durand-Wayland, Inc., LaGrange, Ga.

[21] Appl. No.: 888,968

[22] Filed: May 26, 1992

[51] Int. Cl.⁵ .......................... B07C 5/02; B07C 5/16
[52] U.S. Cl. ................................... 209/538; 209/580; 209/592; 209/912; 198/387; 177/145
[58] Field of Search ............... 209/538, 539, 555, 556, 209/580, 592-596, 652, 698, 701, 912, 939; 198/365, 384, 387, 779; 177/145

[56] References Cited

U.S. PATENT DOCUMENTS

| | | | |
|---|---|---|---|
| 2,769,521 | 11/1956 | Hait | 198/387 |
| 2,853,108 | 9/1958 | Hait | 198/387 X |
| 3,575,292 | 4/1971 | Roda . | |
| 4,033,450 | 7/1977 | Paddock et al. | 198/387 X |
| 4,254,877 | 3/1981 | Rose | 209/594 |
| 4,262,807 | 4/1981 | Leverett | 209/592 |
| 4,413,690 | 11/1983 | Peterson | 177/145 X |
| 4,426,006 | 1/1984 | Horii et al. | 209/912 X |
| 4,586,613 | 5/1986 | Horii | 209/912 X |
| 4,660,665 | 4/1987 | Powell | 177/145 |
| 4,817,744 | 4/1989 | Power | 209/592 X |
| 4,830,195 | 5/1989 | De Greef | 209/648 X |
| 4,957,619 | 9/1990 | Powell | 209/912 X |
| 4,981,205 | 1/1991 | Cowlin | 198/384 X |
| 5,024,047 | 6/1991 | Leverett | 209/912 X |
| 5,101,982 | 4/1992 | Gentili | 209/592 X |

FOREIGN PATENT DOCUMENTS

WO91/04803 4/1991 PCT Int'l Appl. .

Primary Examiner—Joseph E. Valenza
Assistant Examiner—Tuan N. Nguyen
Attorney, Agent, or Firm—Jones & Askew

[57] ABSTRACT

An article-holding cup that has a pair of rotatable rollers for supporting an article thereon, an L-shaped arm extending outward and downward from one side, a second arm extending outward from an opposite side, and a pivotable connector for attaching the cup with others to one of a pair of conveyors in an article sorting apparatus for carrying in a direction of conveyance through a loading zone, a property-determining zone, and a discharge zone. The rollers rotate in response to a wheel rolling on a plate in a property-determining zone to expose different surface areas of the article to optical scanners. A scale and the optical sensor determine weight and color properties of each article during a single pass through the property-determining zone. The cups have lost motion in the vertical direction and travel on rails in the weighing zone, so that the weight of the article in each cup may be determined independently of the conveyor. A plurality of fabric flaps are disposed on spaced-apart rods connected between the two conveyors for gently receiving articles selectively discharged in the discharge zone for grouping with other articles having similar determinable characteristics.

19 Claims, 7 Drawing Sheets

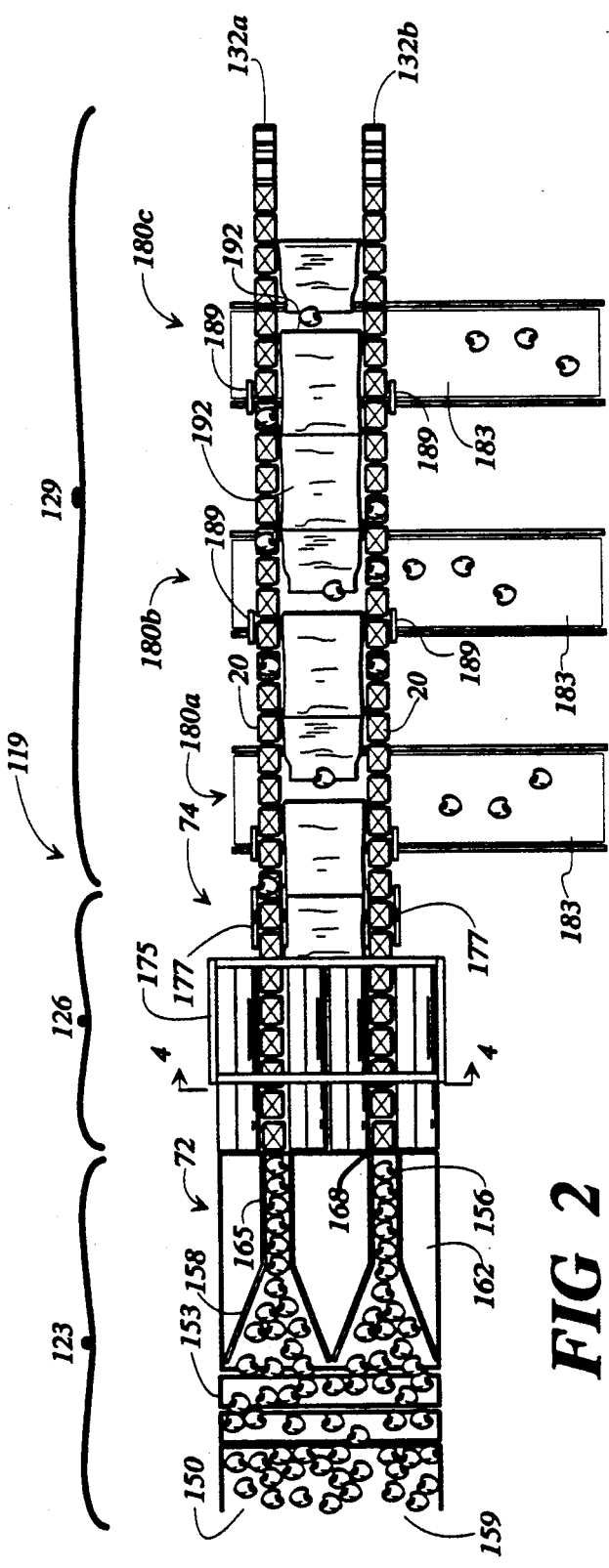
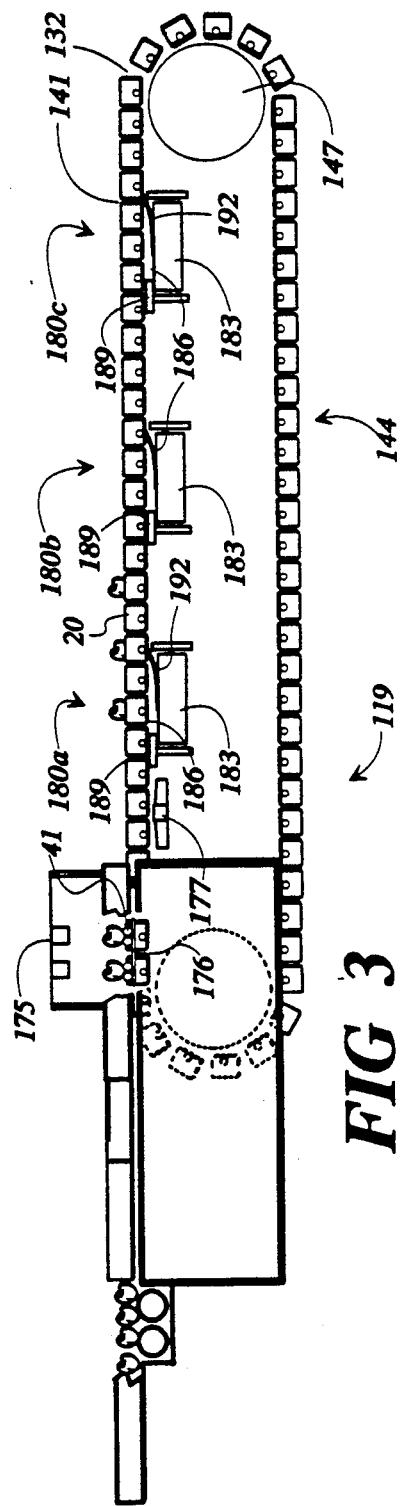
FIG 2
FIG 3

ARTICLE-HOLDING CUP AND SORTING APPARATUS

TECHNICAL FIELD

The present invention relates generally to an apparatus for sorting articles. More particularly, the present invention relates to an article-holding cup that rotates an article held therein for exposing the surface of the article to optical scanners in an apparatus that sorts articles by determinable characteristics.

BACKGROUND OF THE INVENTION

Many types of bruiseable fruits and vegetables are inspected, sorted and packed at processing plants for market. Such fruits and vegetables include apples, oranges, avocados, pears, onions, and the like. Such fruit and vegetable articles are typically sorted into groups of articles having common characteristics such as shape, weight and color. The weight, shape and color are properties which may be determined by a sorting apparatus that receives bulk quantities of articles, determines the properties of each article in sequence, and sorts each article into an appropriate groups based on its determined properties. Often such sorted articles are sold in bags with a pre-printed weight. For example, apples may be weighed on a scale in the sorting apparatus and then sorted into groups based on the determined weight, so that apples having a weight in a particular range are grouped together. The apples are then placed in a bag which contains apples having substantially uniform size and weight. Also, such articles may be sorted into groups depending on the optical or color characteristics of the surface of the articles. Optical devices such as a camera scan the article and the image is processed to determine the optical characteristics of the article, including size and color. For example, red delicious apples may be sorted based on the percentage light red, red, and dark red surface color; apples having common color characteristics may then be grouped together.

Such sorting by determined properties of an article has a number of benefits. Articles that have more valuable characteristics may be sold for a higher price. Consumers benefit by obtaining articles that are uniform in size, weight and appearance. For example, each apple in a bag has substantially similar characteristics, and one of the apples will be substantially the same as the next. As a result, the consumer gains additional confidence in the quality of the articles. Articles exhibiting less valuable characteristics, such as non-uniform size or bruises, may be selected by other value-added processing. For example, apples with non-uniform coloration may be sorted out for cooking into applesauce for canning or mashing to extract the juice for bottling.

Apparatus for sorting such fruit or vegetable articles have been described before. Such apparatus typically has a continuous conveyor carrying a plurality of cups adapted to hold the type of article being sorted. For example, cucumbers preferably have a longer cup than apples which preferably are held in square or rectangular cups. The shape and size of the cups vary depending on the type of article to be sorted and the manufacturer of the sorting apparatus. Each cup receives an single article of fruit or vegetable in a loading zone from a bulk supply of articles. The cups then pass in sequence through a property-determining zone to determine the characteristic or property for which the articles are to be sorted. For example, the articles are weighed on a scale in a weighing zone to determine the weight of the article in each cup. The cups then pass in sequence through a discharge zone where each article is selectively discharged at an appropriate discharge station to group together those articles having similar characteristics.

U.S. Pat. No. 4,254,877 issued to Rose describes a weight sizing apparatus having a plurality of discharge stations. An article discharges at a selected station onto a take-away conveyor which carries the article with others having a weight in the selected range for packing. To reach the take-away conveyor, the article first drops from a carrying cup onto a deflection ramp having a soft surface to cushion the fall of the article. The ramp then directs the article to the take-away conveyor for grouping with other articles. This sorting apparatus however has a disadvantage of subjecting the article to a free-fall drop, which may unnecessarily risk bruising or otherwise damaging the article.

U.S. Pat. No. 4,262,807 to Leverett describes an article carrying cup having lost motion in the vertical direction, thereby permitting the cup to be weighed independently of a conveyor to which the cup is attached. Each cup connects to a conveyor chain by a tow bar and a plurality of ribs extend downwardly from the lower portion of the cup to support the cup on a scale in a weighing zone. The cup moves vertically in a slat at the forward end so that the cup is held independently of the conveyor by the ribs on the scale.

Sorting may be accomplished by properties other than weight. U.S. Pat. No. 3,575,292 issued to Roda describes an apparatus that grades articles by size. The apparatus includes a parallel endless link chain carrying a plurality of spaced apart pairs of parallel rollers. An article is carried on a pair of adjacent rollers for sorting by size. The articles are carried in sequence under a series of grading slats that pivotally mount over the path of the chain. The vertical gap between the rollers on the chain and the slats is adjustable, and the gap sequentially narrows along the line of slats in the direction of travel of the chain. As the chain moves, a rim on each roller contacts a track in which the chain travels, causing the rollers to rotate and thereby cause the article to rotate. If the top of the article does not come into contact with a slat, the article rolls idle but remains on the rollers. The article continues to roll idle until the article is engaged by one of the slats. The article thus engaged then tends to roll in a reverse direction. This is caused by the frictional contact of the article with the slat and the movement of the chain. The chain continues to move, and the rotating rollers cooperate with the slat to cause the article to roll rearwardly from the rollers into a space between adjacent pairs of rollers. The article then falls onto a chute where it is gathered with other articles of a similar size.

U.S. Pat. No. 4,586,613 issued to Horii describes an apparatus for sorting articles carried separately on trays. The apparatus includes a variety of property-determining devices, including a scale and optical scanners for determining weight, size, color, and defects in the article. However, this apparatus has deficiencies in that the fruit or vegetable is placed in a predetermined position which is not changed until the article is discharged. Accordingly, bruises or color differences may be hidden from detection by the optical scanners.

Accordingly, there remains a need in the art for an article-holding cup that rotates the article held thereon for exposing the surface of the article to optical scanners in a sorting apparatus that determines the weight and the optical characteristics of the article during a single pass through a property-determining zone so that articles with like properties may be selectively grouped in a discharge zone.

SUMMARY OF THE INVENTION

The present invention solves the need in the art by providing a carrying cup and a sorting apparatus for determining the weight and the optical characteristics of an article in the carrying cup attached to a continuous conveyor during a single pass of the article through a property-determining zone of the sorting apparatus. Generally described, the cup has one or more rollers that are disposed in the cup for supporting an article thereon. The rollers are caused to rotate while the cup is in a property-determining zone of the sorting apparatus, so that the article rotates in the cup and thereby exposes different portions of its surface to an optical scanner for determining properties, such as the color characteristics, of the article. A connector between the cup and the continuous conveyor provides lost-motion in the vertical direction so that the article is weighed on a scale independently of the conveyor.

Generally described, the article-holding cup comprises two end walls and two side walls connected together to define a rectangular open-end tube. The tube is a frame that carries a pair of parallel rollers for supporting an article thereon. The rollers mount perpendicularly between the side walls at an upper edge of the tube. Each roller includes an axle so that the roller is freely rotatable with respect to the tube. A wheel attaches to each axle at an end that extends outside of one of the side walls. The wheels are disposed parallel to the side wall and are coaxial with the roller. A clip pivotally connects the cup to the continuous conveyor so that the cup can selectively pivot at a selected discharge station and tip the article out for gathering with other articles having similar characteristics.

As the conveyor carries the cup through a property-determining zone, the wheel rolls on a plate which thereby rotates the rollers. In response, the article held on the rollers rotates and exposes different surface areas of the article to optical sensors that determine optical characteristics, such as color, size, shape, and defects, for each article.

The cup in a preferred embodiment is supported on the scale independently of the conveyor, with lost motion in the vertical direction. The clip that pivotally connects the cup to the conveyor comprises a pivot pin disposed between the end walls of the tube and a bracket attached to the pin that engages the continuous conveyor. The ends of the pin are received by a pair of slots that are transversely aligned with respect to each other in the end walls. The slots extend upward from a bottom edge of the tube and are of a size that the ends of the pin freely travel vertically in the slot.

More particularly described, the present invention provides a cup for an apparatus that groups articles by weight and by optical characteristics determined during a single pass of the article through a property-determining zone. The apparatus includes a plurality of cups attached to the continuous conveyor. Each of the article-holding cups further includes two arms that each extend outward from opposite sides of the cup. A first arm is a plate-like flange; the other arm is L-shaped with a free portion that extends downward away from the bottom edge of the cup. The first arm is horizontally disposed in alignment with the bottom edge of the cup. Accordingly, the free end of the L-shaped arm and the first arm are spaced-apart vertically for a purpose discussed below. The scale includes a pair of parallel, spaced-apart rails having upper cam surfaces. The cam surfaces are contacted by the pin and the free end of the arm when the cup is being weighed. The height of the rails are different and the shorter rail aligns with the free end of the L-shaped arm; the taller rail aligns with the first arm. The total vertical distance of the aligned L-shaped arm and rail is the same as that for the first arm and rail on the opposite side of the cup. This permits the cup to be horizontal during weighing on the scale.

A discharge zone is provided for selectively grouping articles with like properties. In a preferred embodiment of a sorting apparatus using the cup disclosed herein, possible bruising or other handling damage to the article is reduced by discharging the selected article onto a fabric flap carried between a pair of parallel conveyors. The flap cushions the transfer of the article from the respective cup to the take-away conveyor. A plurality of spaced-apart rods each carry a fabric flap and the ends of each rod connect perpendicular to the conveyors. The rods travel in a horizontal plane that is above the cam surface of the shorter rail. The rods preferably are between the lower free end of the L-shaped arm and the bottom of the cap. The rods thereby pass over the scale while the cups contact the scale for weighing.

Accordingly, it is an object of the present invention to provide an improved apparatus for sorting articles such as fruit or the like.

It is another object of the present invention to provide an improved cup for holding such articles while at least one property of the article is being determined.

It is a further object of the present invention to provide an article carrying cup that rotates an article to expose different surfaces to optical scanning sensors in a property-determining section of a sorting apparatus and that holds the article on a scale in the property-determining section independently of a conveyor which carries the cup.

It is another object of the present invention to provide a cup that supports an article during weighing and during scanning, without transfer to another article-holding device.

It is another object of the present invention to provide an article-holding cup that supports an article on at least one rotatable roller.

It is another object of the present invention to provide an article-holding cup that supports an article on a pair of rotatable rollers.

It is another object of the present invention to provide a cup with a wheel that rolls on a stationary member for importing rotation to one or more rollers in the cup.

It is another object of the present invention to provide a sorting apparatus that sorts articles by determinable characteristics.

It is another object of the present invention to provide a sorting apparatus that sorts articles by weight and by optically-sensed properties.

It is another object of the present invention to provide a cup carried by a conveyor in a sorting apparatus that weighs an article independently of the conveyor.

It is another object of the present invention to provide an article sorting apparatus that reduces damage to articles discharged for gathering in a selected group.

It is another object of the present invention to provide a sorting apparatus using fabric flaps for discharging articles selectively into a group of articles with like determinable characteristics.

Other objects, features and advantages of the present invention will become apparent upon reading the following detailed description of the disclosed embodiment of the present invention, in conjunction with the appended drawings and claims.

BRIEF DESCRIPTION OF THE DRAWINGS

FIG. 2 is a top view of a sorting apparatus that uses the cup shown in FIG. 1.

FIG. 3 is a side elevation view of the apparatus shown in FIG. 2.

DETAILED DESCRIPTION OF THE PREFERRED EMBODIMENTS

Figure 1:
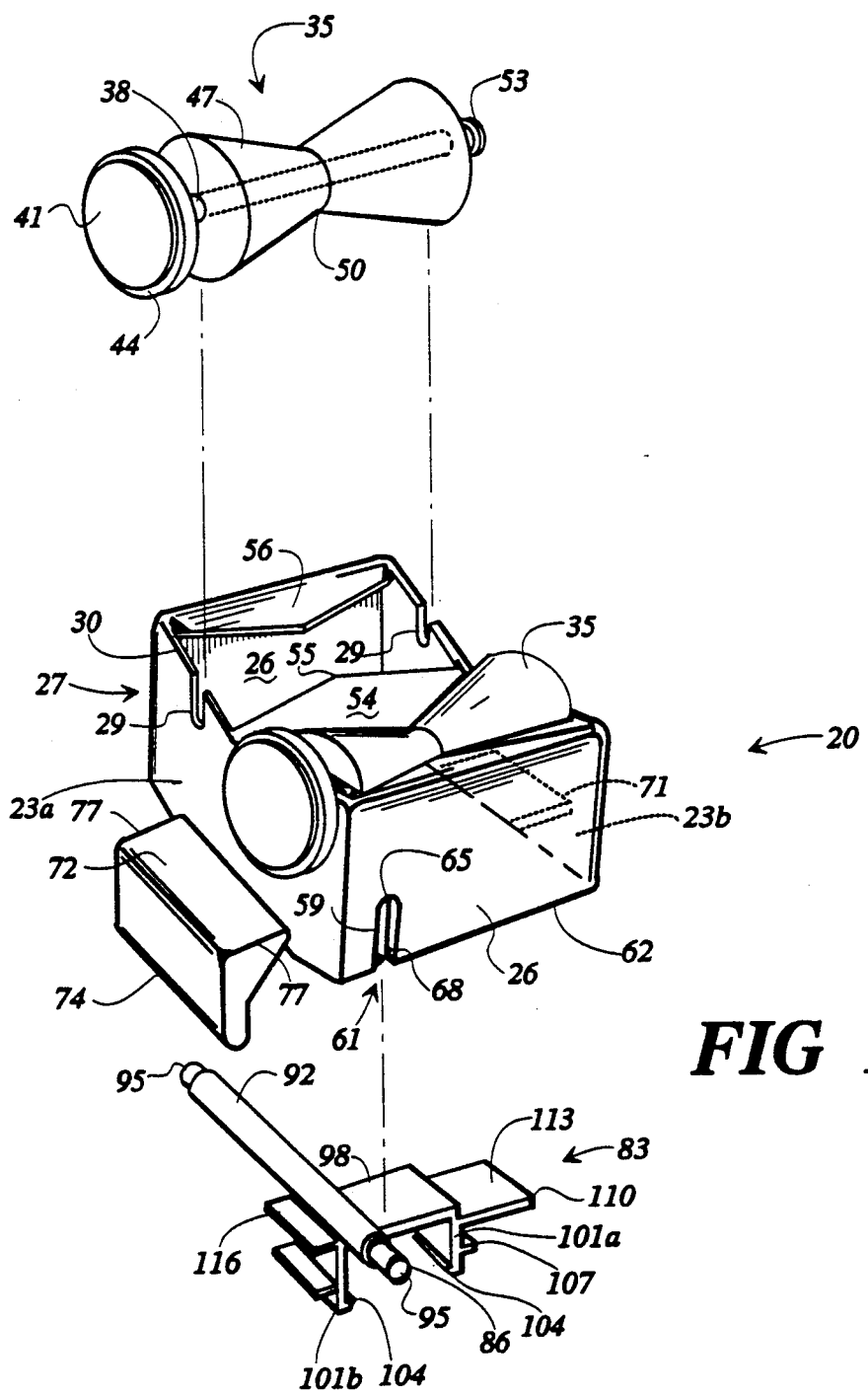
FIG. 1 is an exploded pictorial view of an article-holding cup constructed in accordance with a preferred embodiment of the present invention.

Referring now to the drawings, FIG. 1 shows an article article-holding cup 20 constructed in accordance with a preferred embodiment of the present invention. The cup 20 comprises a pair of side walls 23a and 23b and a pair of end walls 26 joined together to define a rectangular tube 27. Each of the side walls 23 includes a pair of parallel slots 29 that extend downwardly from an upper edge 30 of the cup 20 parallel to the end walls 26. The upper edge 30 on the side walls 23 of the illustrated embodiment is defined by a smooth parabolic curve. Each of the slots 29 is spaced inwardly from one of the end walls 26 and is transversely aligned with a respective slot on the opposite side wall 23 for receiving a rotatable axle therein as discussed below.

The tube 27 defines a frame in which a pair of rollers 35 mount at the upper end for supporting an article thereon in the cup 20. Each of the rollers 35 includes an axle 38 that is supported by a pair of the aligned slots 29 in the opposing side walls 23, so that the rollers are spaced apart and parallel in the cup 20. A wheel 41 attaches coaxially to a first end 42 of the axle 38 that extends through the slot 29 outwardly from a first side wall 23a. The wheel 41 is spaced from the side wall 23a and oriented to rotate in a plane parallel to the side wall. The wheel 41 receives a resilient ring 44 around the circumference thereof for a purpose discussed below.

A pair of resilient supports 47 coaxially mount on each of the axles 38. The supports 47 are preferably frustro-conical in shape and are oriented on the axle 38 so the smaller ends 50 of the supports face each other. This orientation defines a broad V-shape for each roller 35 as seen in a side view, and the two parallel rollers 35 cooperate to hold an article on the resilient supports 47. A cap 53 connects to the axle 38 on a second end thereof and cooperates with the outside surface of the wall 23b to keep the axle in the slot 29. As illustrated in FIG. 1, the rollers 35 mount in the upper end of the cup 20 in the slots 29 for rotation around the axis 38 in order to rotate the article held on the supports 47.

A cross member 54 is disposed between the parallel rollers 35 to provide rigidity to the cup 20. The cross member 54 extends between the side walls 23 and connects to the upper edge 30 of the cup 20 halfway between the opposing end walls 26. The cross member 54 in the illustrated embodiment has an elongate diamond shape in top view, with upwardly-pointed side tips 55 medial the side walls 23. The upper surface of the cross member 54 is shallowly concave and the tips 55 of the cross member 54 are higher than the ends which connect to the upper edge 30 of the cup 20.

Each end wall 26 includes a shoulder 56 that tapers inward and downwardly towards the cross member 54 from the upper edge 30 of the cup 20. The shoulder 56 in the illustrated embodiment is roughly triangular in shape with an apex angled downwardly toward the adjacent roller 35. The shoulders 56, the rollers 35, and the cross member 54 cooperate to support an article in the cup 20.

The end walls 26 of the cup 20 also each include a vertical elongate slot 59 near the side wall 23a. The slots 59 are transversely aligned with respect to each other and each slot extends upward from an open end 61 at a bottom edge 62 of the wall 26. The upper ends 65 of the slots 59 define semi-circular shapes for a purpose discussed below. A pair of opposed lugs 68 at the open end 61 project towards each other from the sides of each slot 59 for a purpose discussed below.

Figure 6:
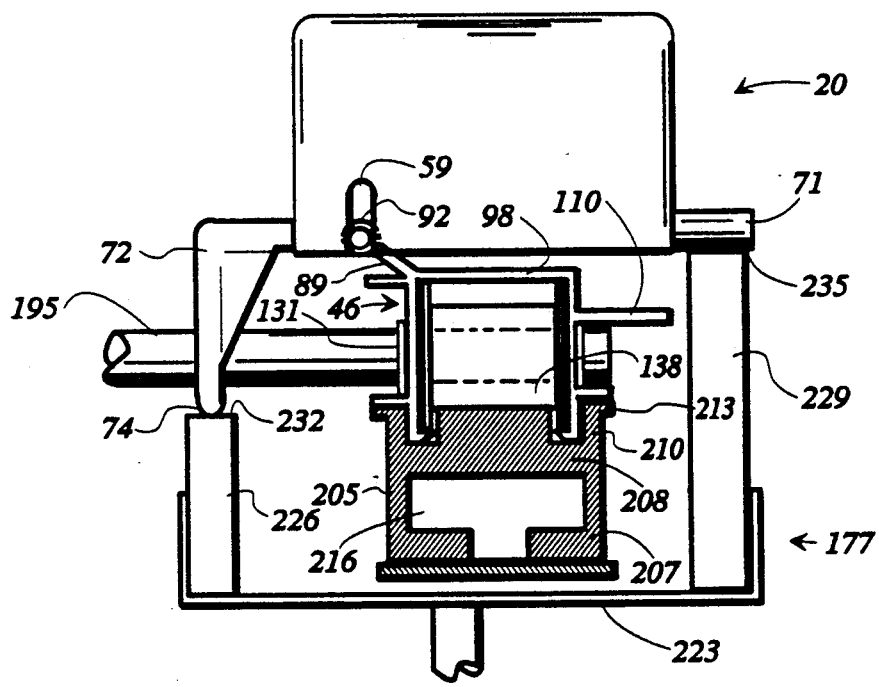
FIG. 6 is a cross-sectioned end elevation view taken along line 6—6 of FIG. 5 showing the article-holding cup and the scale in the weighing zone.

Each of the cups 20 includes an arm 71 and an L-shaped arm 72 for supporting the cup on the scale and for tipping the cup to discharge the article from the cup. Each arm extends laterally from a separate one of the side walls 23. The arm 72 includes a free end 74 extending below the bottom edge 62 of the cup 20, as best seen in FIG. 6. The arm 71 is disposed with its bottom surface horizontally aligned with the bottom edge 62, so that the arm 71 and the free end 74 are spaced-apart vertically. The arms 71 and 72 align symmetrically with the transverse axis of the cup 20, placing the front and back edges 77 of the arms 71 and 72 equidistant from the transverse axis. The bottom surfaces of the arms 71 and 72 preferably include projections extending downwardly for supporting the cup. In an alternate embodiment (not illustrated), the bottom surface of the arm 71 includes a single projection that cooperates with the two projections on the free end 74 of the arm 72 to provide a three-point support of the cup in the weighing zone.

As shown in exploded view, the cup 20 includes a bracket 83 for connecting the cup to a conveyor in the sorting apparatus, as discussed below. The bracket 83 comprises a U-shape chain clip 86 with an arm 89 (best illustrated in FIG. 6) extending outwardly and upwardly from the chain clip, and a pivot pin 92 at the end of the arm. The pivot pin 92 is disposed parallel to the side walls 23 and the longitudinal ends 95 of the pivot pin insert loosely into the slots 59 in the end walls 29 of the cup 20. The lugs 68 extend outwardly a distance sufficient to hold the end 95 in the slot 59 but still permit the end to snap past and into the slot during assembly. The width of the slot 59 is sized to permit the pin 92 to move vertically in the slot. The cup 20, accordingly, is freely pivotably about the pivot pin 92. The cup 20 also is movable vertically when it is in a horizontal position. This vertical movement permits the cup 20 to be weighed independently of the conveyor which carries the cup.

The chain clip 86 defines an inverted U-shape with a base 98 and two legs 101a and 101b. Each leg 101 terminates in an inwardly-extending tooth 104 that extends under a side plate of the conveyor chain to hold the clip on the conveyor as discussed below. A flange 107 extends laterally outwardly from a lower portion of the side of each leg 101. An arm 110 extends from an upper portion of the leg 101a toward the side wall 236 of the cup 20. An upper surface 113 of the arm 110 contacts the bottom edge 62 of the outside wall 23b when the pivot pin 92 is at the upper end 65 of the vertical slot 59. The pivot pin 92 and the arm 110 thereby cooperate to carry the cup 20 horizontal on the conveyor. As discussed below, the pivot pin 92 also permits the cup 20 to pivot from the conveyor in order to tip an article out of the cup at a selected discourage station. A second arm 116 extends from an upper portion of the leg 101b and acts as a stop against the interior surface of the side wall 23a to keep the cup 20 from pivoting beyond a predetermined amount.

FIGS. 2 and 3 illustrate in top view and in side view, respectively, an apparatus 119 for sorting articles according to characteristics ascertained in a property-determining section of the apparatus. A plurality of the cups 20 constructed in accordance with the present invention are used for holding articles to be sorted with the apparatus 119. In the illustrated embodiment, the apparatus 119 comprises a loading zone 123, a property-determining zone 126, and a discharge zone 129. The cups 20 attach to a pair of continuous conveyors 132a and 132b that pass through the three zones for sequentially loading, evaluating, and discharging articles.

Figure 7:
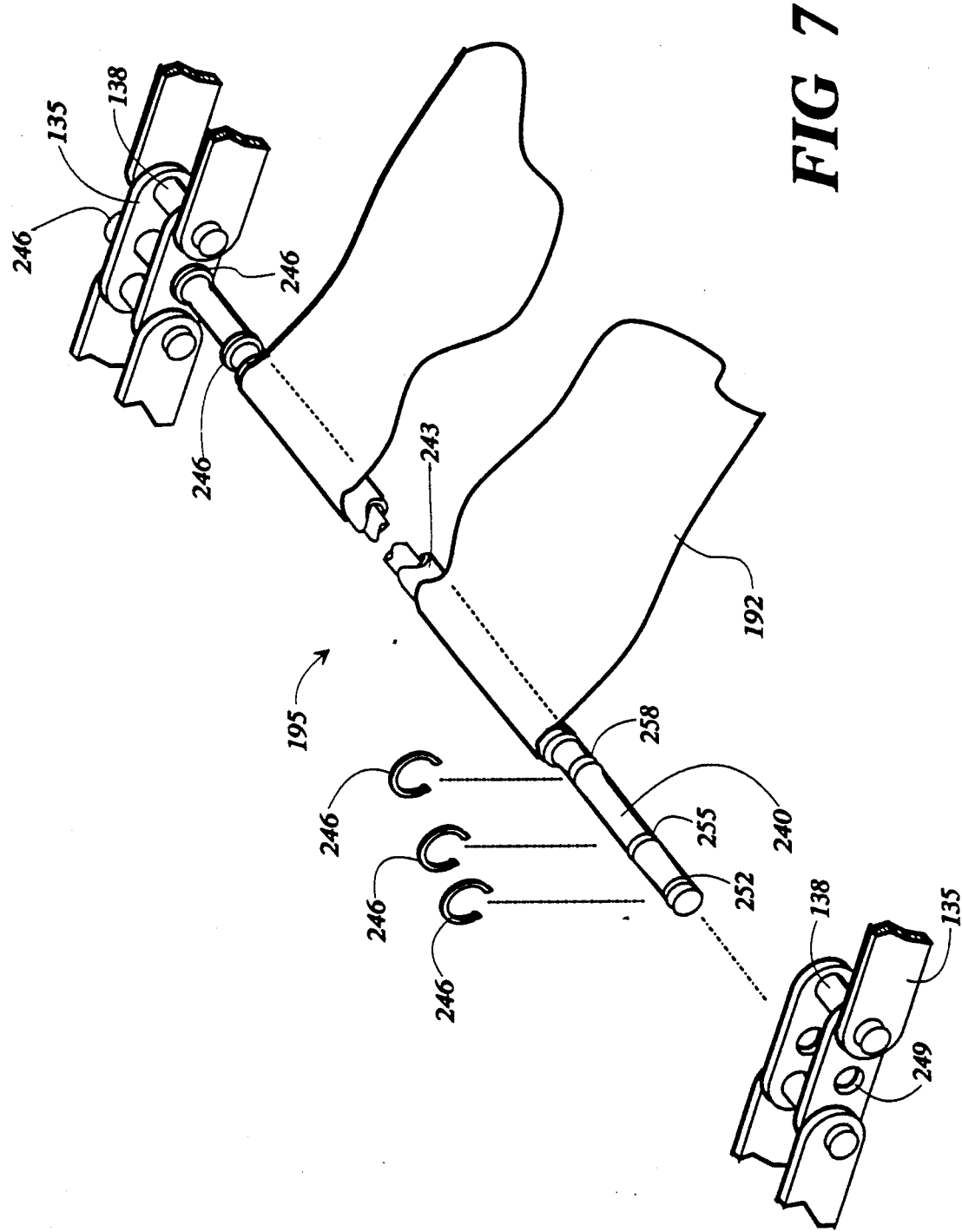
FIG. 7 is an exploded and pictorial cut-away view of a rod that connects between the parallel conveyors of the apparatus shown in FIG. 2 and carries a fabric flap for receiving discharged articles.
Figure 8:
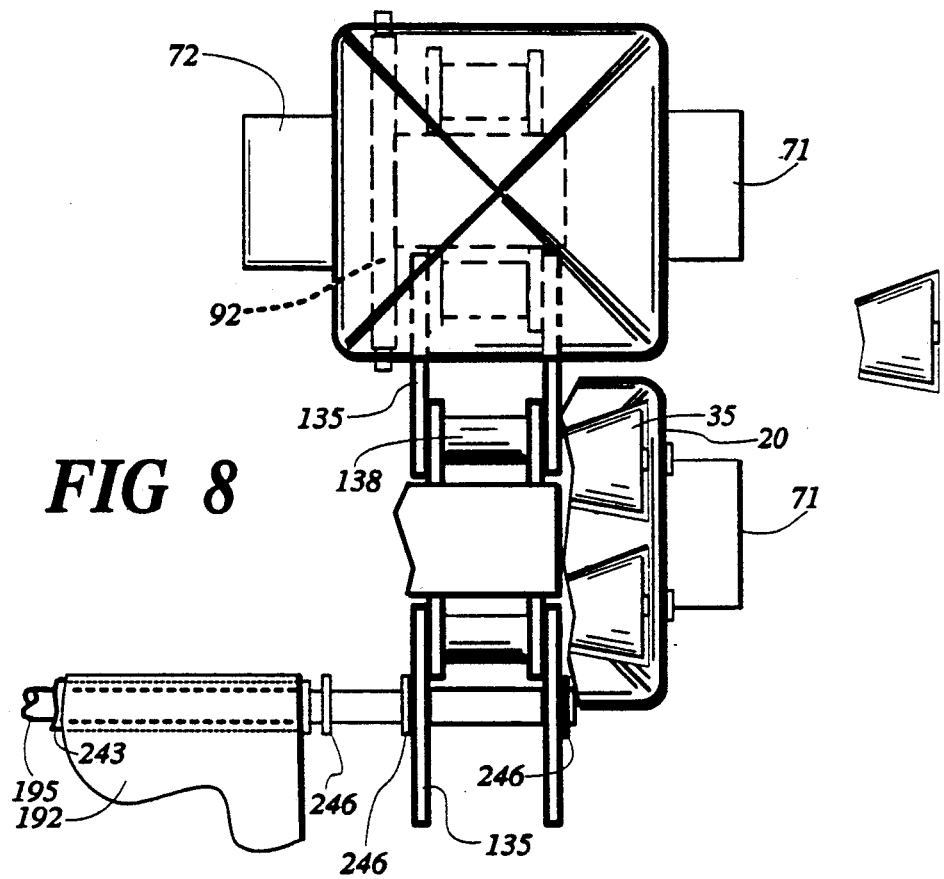
FIG. 8 is a top view illustrating the rod shown in FIG. 7 connected to one of the pair of conveyors in the apparatus shown in FIG. 2.

The conveyors 132 are parallel and spaced-apart. Each conveyor 132 includes a continuous link chain made from a plurality of plates 135 and rollers 138 (as best illustrated in FIGS. 7 and 8). The rollers 138 in the chain are disposed horizontally. As illustrated in FIG. 3, each conveyor 132 has an upper flight generally designated 141 and a return flight generally designated 144. The conveyors 132 are operatively engaged around a pair of spaced-apart sprockets 147. A drive motor (not illustrated) drives at least one of the sprockets 147. Each conveyor 132 accordingly travels in a vertical plane around the sprockets 147.

In the illustrated embodiment, the loading zone 123 includes a supply bin 150 that holds a plurality of articles to be sorted. The supply bin 150 feeds the articles to a roller separator 153 that communicates a line of articles to a pair of V-shaped singulators 156. A belt conveyor 159 in the supply bin 150 carries articles asynchronously to the roller separator 153 which separates the articles into rows. This maintains an orderly flow of articles from the supply bin 150 to the conveyors 132. Another belt conveyor 162 carries the articles from the roller separator 153 through the V-shaped singulators 156. Each singulator 156 narrows to a trough 165 with an exit 168 adjacent the leading end of the upper flight 141 of one of the conveyors 132.

The property-determining section 126 includes a housing 175 that supports the lights and the sensors used to determine optical properties of the articles. The housing 175 also supports a horizontally disposed plate 176 on which the wheels 41 of the cups 20 travel in order to rotate the articles contained in the cups. The property-determining section 126 also includes a scale 177 downstream of the optical sensors. The housing 175, the plate 176, and the scale 177 are further discussed below.

The discharge zone 129 includes a plurality of selectable discharge stations 180. The illustrated embodiment has three stations 180a-c downstream of the property-determining zone 126, although more such stations may be gainfully used because of the many groups into which articles may be sorted with the apparatus. For example, sorting articles into five weights and four ranges of colors requires twenty discharge stations. Each station 180 includes a take-away conveyor 183 disposed vertically below the upper flight 141 to define a receiving area generally designated 186. The take-away conveyors 183 extend laterally from the conveyors 132 and carry articles from the discharge station 180 to the packing equipment (not illustrated) that hold, fill, and transfer containers of articles. Such packing equipment is well known in the art. Each discharge station 180 includes the selectively activated discharge mechanism 189 (discussed below) to move an article from the cup 20 onto a selected take-away conveyor 183. Each station 180 discharge articles having like weight and optical characteristics within a range for such properties and each station collects articles in a range different from the other stations. The final discharge station 180c receives all articles not previously discharged.

Figure 4:
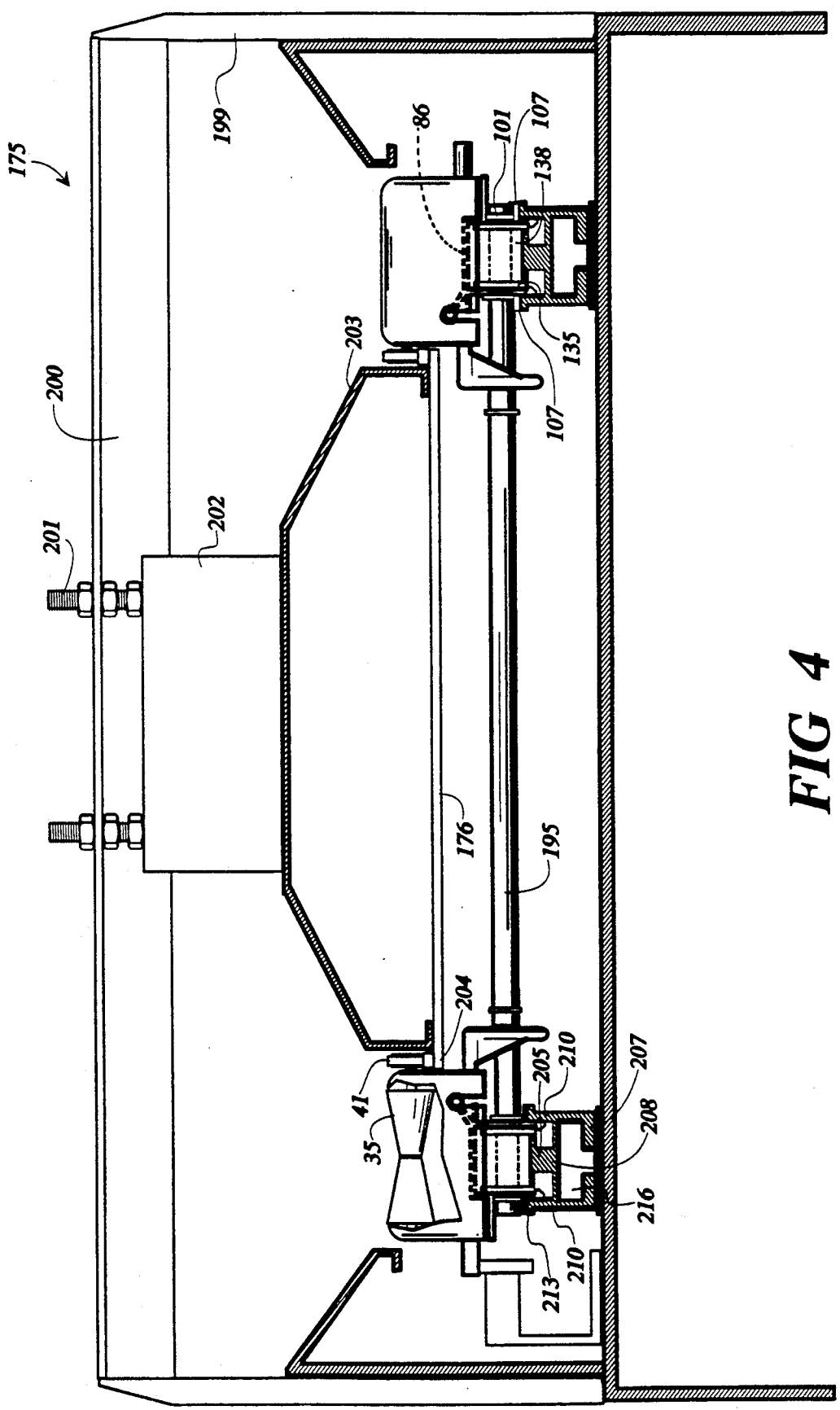
FIG. 4 is a cross-sectioned end elevation view, taken along line 4—4 in FIG. 2 of the property-determining zone showing a wheel of the cup illustrated in FIG. 1 contacting a plate for rotation.
Figure 5:
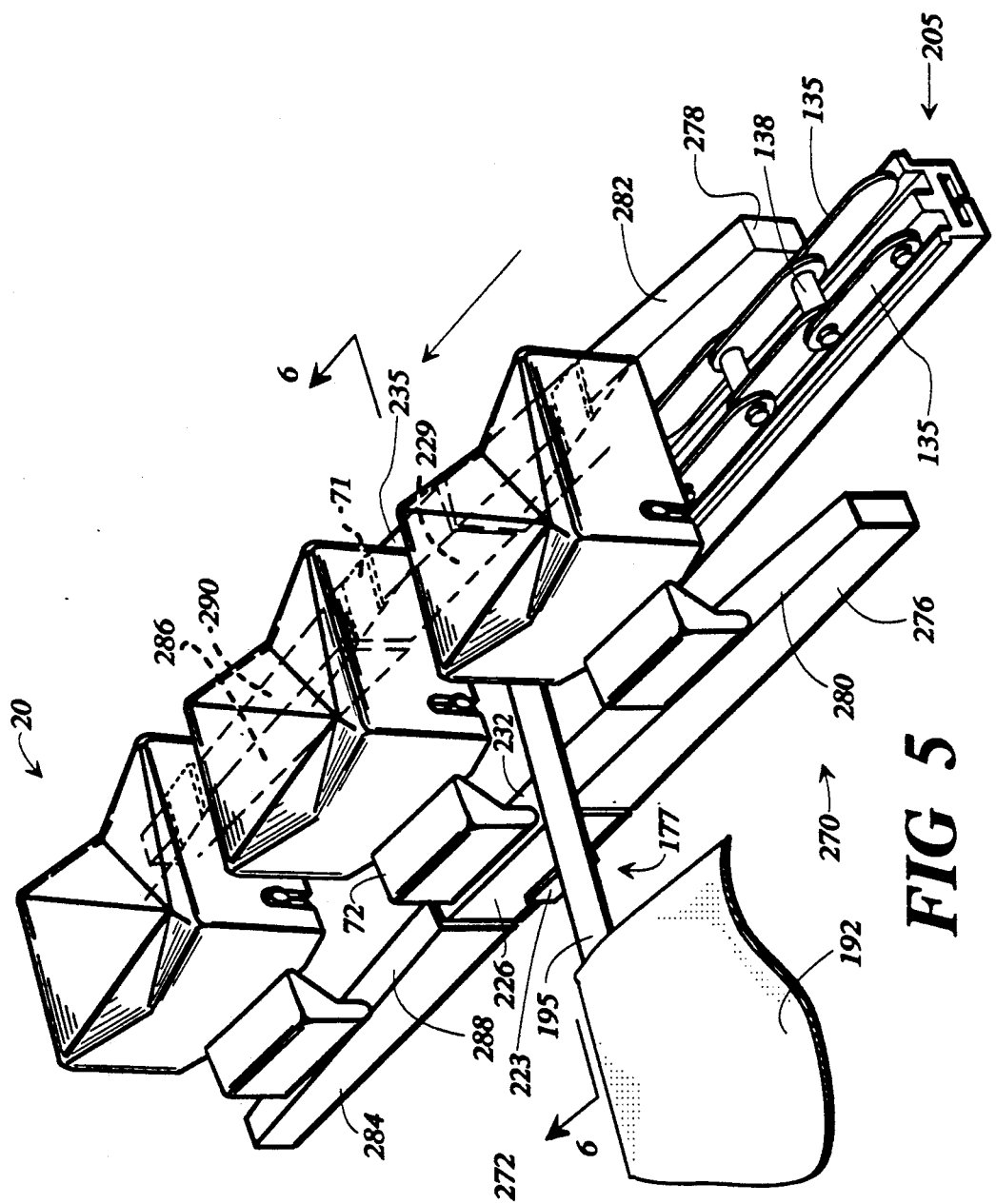
FIG. 5 is a cut-away pictorial view of the scale in the weighing zone of the sorting apparatus shown in FIG. 2.

A fabric flap 192 is carried on one of a plurality of spaced-apart rods 195, FIGS. 4 and 5. The ends of the rods 195 connect to the conveyors 132a and 132b, as discussed below, so that the rods are disposed perpendicularly between the conveyors 132. The fabric flaps 192 are not illustrated on the return flight 144.

FIG. 4 is a cross-sectional view of the property-determining zone 126, taken along line 4—4 of FIG. 2, showing the housing 175 that supports the plate 176 on which the wheels 41 of the cups 20 travel in order to rotate the rollers 35. The housing 175 includes a pair of side walls 199 connected at the upper ends by a cross member 200 from which the plate 176 is suspended. A plurality of bolts and nuts 201 join a vertically disposed plate 202 to the cross member 200. A center divider 203 rigidly connects to the bottom of the plate 202 and is thereby disposed between the two conveyors 132. The plate 176 rigidly connects to the bottom edge of the center divider 203 and a lip 204 extends laterally from the sides of the center divider. The wheels 41 travel on the lip 204 of the plate 176, as discussed below. Appropriate lights and sensors are suspended over the housing 175 for determining optical characteristics of the articles in the property-determining section 126. Such lights and optical sensors are well known in the art.

Each of the conveyors chains travel in a track 205 which is secured to the frame 206. The track 205 has a base 207, an intermediate cross member 208, and a pair of side walls 210. A flange 213 extends outward laterally from the upper ends of the side walls 210. The intermediate cross member 208 cooperates with the base 207 to define a slot indicated as 216 for receiving one of a plurality of bolts (not illustrated) for securing the track 205 to the frame 206. The fabric flap 192 is not illustrated on the rod 195 in FIG. 4.

The cups 20 connect to the conveyors 132 by pushing the chain clip 86 onto a chain link of the conveyors 132. The chain clip 86 straddles the link plates 135 with the legs 101. The teeth 104 hold the clip 86 to the link from below. The flanges 107 of the chain clip 86 contact and travel on the flanges 213 extending from the side walls 210. The rollers 138 in the chain contact and travel on the upper surface of the cross member 208 of the track 205.

FIGS. 5 and 6 illustrate the scale 177 which cooperates with the cup 20 for weighing an article held in the cup. The scale 177 includes a weighing platform 223 and a pair of spaced-apart rails 226 and 229 disposed in general parallel alignment. The rails 226 and 229 connect to the sides of the U-shaped weighing platform 223. The weighing platform 223 connects to a load cell (not illustrated). The load cell provides analog signals which are fed through an amplifier and filter to an analog-digital converter. These analog signals are proportional to the weight detected by the load cell for both the cup 20 and its article. Such signals are converted to digital signals in the digital converter and are fed to a controller. The controller is programmed to associate the detected weight with the particular cup 20 on the scales. The nature and operation of such a scale in a weighing apparatus are known to those skilled in the art and are not further disclosed herein.

The rails 226 and 229 are in parallel alignment and each have an upper cam surface 232 and 235, respectively. The heights of the rails 226 and 229 are different, with the height of the rail 226 less than the height of the rail 229. The shorter rail 226 aligns with the L-shaped arm 72 and its free end 74. The taller rail 229 aligns with the arm 71. The free end 74 on the arm 72 travels on the upper cam surface 232 when the cup 20 is weighed. Similarly, the bottom surface of the arm 71 travels on the upper cam surface 235 during weighing. The total vertical distance for the aligned arm 72 and the shorter rail 226 is the same as that of the arm 71 aligned with the taller rail 229 on the opposite side of the cup 20. This permits the cup 20 to be horizontal during weighing.

FIGS. 7 and 8 illustrate one of the series of the rods 195 which are disposed perpendicular between the conveyors 132. Each rod 195 includes an attachment rod 240, a tube 243 loosely received on the attachment rod 240, the flap 192, and a plurality of stop rings 246. The ends of the attachment rod 240 insert through holes 249 in the respective opposite plates 135 of the conveyor chains 132a and 132b. Each end of the attachment rod 240 includes a plurality of grooves 252, 255, and 258 around the outer circumference of the attachment rod. The groove 252 is disposed near the edge of the rod end that lies outwardly of the chain link so that the groove 255 is adjacent the outside of the plate 135. The groove 255 is spaced inwardly from the groove 252 a distance slightly greater than the width of the conveyor chain to position the groove 255 near the inside face of the second plate 135 of the link in the conveyor chain. Each groove 252 and 255 receives one of the stop rings 246, which preferably are C-shaped rings that snap into the grooves. The rings 246 in the grooves 252 and 255 between the chain link loosely secure the end of the attachment rod 240 to the chain link. The rings 246 prevent the attachment rod 240 from moving laterally out of the holes 249 in the plates and thus prevent the rod from moving out of engagement with the conveyor 182. Thus, the rod 195 is disposed perpendicular between the conveyors 132a and 132b for carrying thereby as the conveyors travel through the sorting apparatus.

Each of the grooves 258 is spaced inwardly of the groove 255 and each also receives one of the stop rings 246. The grooves 258 cooperate to hold the tube 243 in position between the conveyors 132. The tube 243 is received on the attachment rod 240 and has a diameter greater than that of the rod so that the tube may freely rotate on the rod. FIG. 8 is a top view of the rod 195 connected to the chain of the conveyor 132b. One of the fabric flaps 192 attaches to each of the rods 195 by wrapping over the tube 243. One end of the flap 192 folds over and attaches to itself to form an open and loop. The tube 243 passes through the loop. The tube 243 is received by the attachment rod 240 and the stop rings 246 are snapped into the grooves 258. The attachment rod 240 is positioned through the holes 249 in the plates 135 and the stop rings 246 are snapped into the grooves 252 and 255 to hold the attachment rod 240 in place. As the rod 195 moves with the conveyors 132, the fabric flap 192 moves through the discharge stations 180. The flap 192 falls into the receiving area 186 in each station 180 in sequence to cushion the transfer of an article from the cup 20 to the take away conveyor 183.

With reference to FIG. 5, the scale includes an entrance ramp 270, and an exit ramp 272. The entrance ramp 270 includes a pair of parallel spaced apart side rails 276 and 278. The rails 276 and 278 each have upper cam surfaces 280 and 282, respectively, which taper upwardly in the direction of travel for the conveyor as indicated by the arrow. The height of the side rail 276 is lower than the height of the side rail 278. Similarly, the exit ramp 272 is defined by a pair of parallel, spaced apart rails 284 and 286 with cam surfaces 288 and 290, respectively, which taper downward in the direction of travel of the conveyor.

The leading end of the entrance ramp 270 is disposed vertically below the planes in which the free end 74 and the arm 71 travel. The rise between the leading and trailing ends of the entrance ramp 270 is approximately the length of the vertical slot 29 in the cup 20. the height of the rail 226 is such that the connector rod 195 moves in a horizontal plane displaced vertically higher than the plane occupied by the upper cam surface 232 of the rail in the weighing section.

FIG. 6 is a cross-sectional view of the cup 20 supported by the arm 71 and the free end 74 on the scale 177 in the weighing zone, taken along the line 6—6 of FIG. 5. The arm 71 rests on the cam surface 235 of the rail 229. The free end 74 of the arm 70 rests on the cam surface 232 of the rail 226. The conveyor chain travels in the track 205 with the rollers 138 of the chain traveling on the upper surface of the cross member 208. The legs 101 of the chain clip 86 straddle over the plates 135 of the chain.

Figure 9:
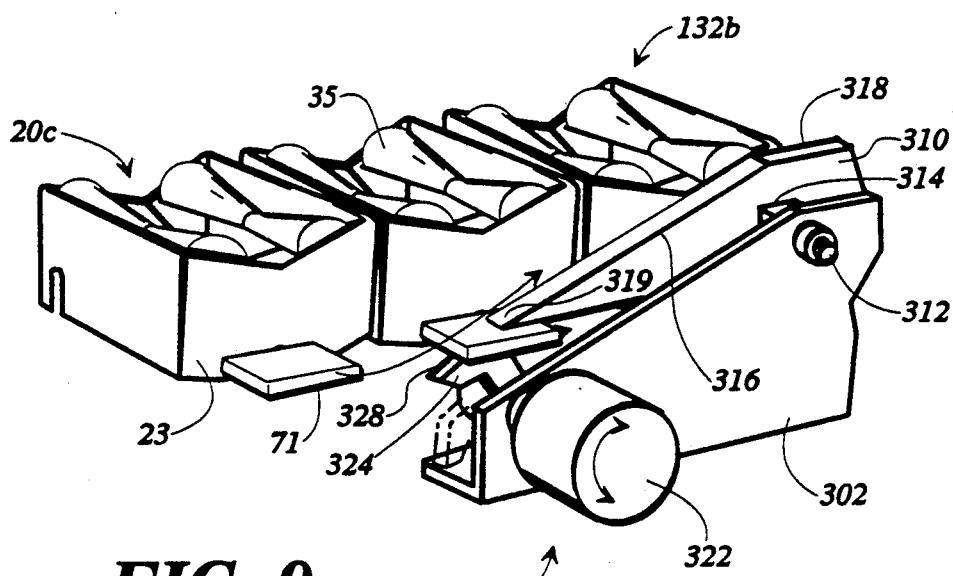
FIG. 9 is a pictorial view of a discharge mechanism in the discharge station of the apparatus shown in FIG. 2.

FIG. 9 illustrates in perspective view a discharge mechanism 300 for one of the discharge stations 180 in the charge zone 129. The discharge mechanism 300 mounts to the sorting apparatus adjacent the side walls 23 of the cups 20. A bridge support 302 attaches to the frame (not illustrated) of the sorting apparatus 119. A bridge 310 connects to the top edge of the bridge support 302 with a plurality of bolts 312, each of which passes through a spacer 314 to position the bridge 310 offset from the bridge support 302 and adjacent the conveyor 132b. The bridge 310 is an elongate member with an upwardly tapered entrance ramp 316 that leads to a horizontal cam surface 318 and a downwardly tapered exit ramp (not illustrated) thereafter. A bottom edge 319 of the bridge 310 is vertically higher relative to the horizontal plane in which the arm 71 of the cups 20 travel on the continuous conveyors 132b. The arms 71 accordingly pass under the bridge 310 unless otherwise directed onto the bridge, as discussed below.

A solenoid 322 mounts at the upstream end of the bridge support 302 adjacent the entrance ramp 316. The solenoid 322 rotates a shaft between two positions as indicated by the arrows. A bridge strut 324 having an L-shape attaches at the end of one leg to the shaft of the solenoid 322. A second leg of the bridge strut 324 angles downward. A back surface 328 of the second leg defines a ramp. It will be appreciated that a similar discharge mechanism 300 as discussed above is also disposed in the discharge stations 180 for the conveyor 132a, as illustrated in FIG. 2.

When the solenoid 322 is energized, the shaft of the solenoid rotates and pivots the bridge strut 324 from a first position against the bottom of the bridge support 302 (as illustrated in phantom lines) to a second position adjacent the entrance ramp 316 of the bridge 310. In this second position, the back surface 328 of the bridge strut 324 acts as an extension of the upward tapered entrance ramp 316 of the bridge 310. The back surface 328 thus extends through the horizontal plane in which the arm 71 travels. When the solenoid 322 is de-energized, the solenoid returns the shaft to its original position, thereby rotating the bridge strut 324 away from the bridge 310 back to its first position against the bridge support 302. In this first position, the back surface 328 of the bridge strut 324 is disposed below the horizontal plane in which the arm 71 travels.

The operation of the weighing and sorting machine as described now is discussed. First with reference to FIG. 2, the supply bin 150 receives a supply of articles. The articles typically sorted by optical characteristics and weight are fruits or vegetables, such as apples, pears, potatoes, onions or the like. These articles have varying weights and surface appearances, and typically are sold grouped in bags with articles having similar weights. The conveyors 159 moves the articles in the bin 150 to the roller separator 153 which gathers the articles gather into rows. The articles then transfer from the roller separator 153 to the singulator 156. This transfer maintains an orderly flow of articles from the supply bin 150 to the conveyors 132. The singulator 156 funnels the articles into single file as the conveyor 162 moves the articles through the V-neck of the singulator. Each article exits at 168 onto one of the cups 20 carried by the conveyor 132. As illustrated in FIG. 4, the walls 174 in the V-shape trough of the guide section 171 guide each one of the articles onto a separate cup 20. The wall 173 prevents articles from leaving the loading zone 123 except on a cup 20. Each of the cups 20 thus holds one of the articles on the rollers 35 to be optically scanned, weighed and sorted.

The continuous conveyor 132 carries the cup 20 from the loading zone 123 along the elongate track 205 to the property-determining zone 126 where optical sensors and a scale are used to determine characteristics about each article. With reference to FIGS. 3 and 4, the cups 20 pass through the housing 175 that supports the center divider 203 between the two conveyors 132a and 132b. A plurality of lights and at least one optical sensor (not illustrated) are disposed above the housing 175. The optical sensors, such as digital cameras, and the lights are of a type well known in the art. In a preferred embodiment, one camera is centered above the housing 175 and is adapted to scan both conveyors 132a and 132b. The use of such cameras for determining optical characteristics of articles is well known in the art.

In order for the optical sensors to scan a substantial amount of the surface of the article, the rollers 35 are caused to rotate and thereby turn the article supported thereon. The wheels 41 with the resilient ring 44 contact the plate 176 supported by the center divider 203 in the housing 175. As the cup 20 is moved by the conveyor 132, the wheel 41 turns in response to the contact with the plate 176. The wheels 41 are connected to the axle 38 of the rollers 35 which rotate in response to the wheel 41 turning against the plate 176. Rotation of the rollers 35 causes the article held on the resilient supports 47 to likewise rotate.

Accordingly, the optical sensor scans a substantial portion of the surface of the article held in the cup 20 as the cup 20 passes through the housing 175. In the preferred embodiment, the digital camera simultaneously scans four cups 20 on each of the two conveyors 132a and 132b. The digital camera is controlled to make four scans of each article as the article rotates in the cup 20 as it passes through the housing 175. Such rotation exposes different areas of the surface of the article to the digital camera. The image received by the digital camera is communicated to a processor in order to determine the characteristics of the article for classifying and subsequent discharge with other articles having similar characteristics. Such processing and classifying technology is well known in the art.

The cup 20 in an alternate embodiment includes only one roller 35 which cooperates with the shoulder 56 to support an article thereon. The roller 35 is rotated in the property-determining zone 126 so as to rotate the article. For example, the wheel 41 disposed outwardly of the sidewall 23a rolls on the plate 176 in order to rotate the roller 35. The sloping shoulder 56 could be more steeply angled, if necessary, to cooperatively support and rotate the article in the cup 20. A second alternate embodiment thereof includes a second roller as an idler roller disposed parallel to the one roller 35. The idler roller rotates in response to the rotation of the article supported on the rollers. The idler roller therein may be cylindrical in shape for supporting the article thereon.

The cups then enter the weighing section of the property-determining zone 126. With reference to FIGS. 5 and 6, the support for each cup 20 on the scale 177 shifts in the weighing zone from the pivot pin 92, the chain clip 86, and the track 205, to the arm 71 and the L-shape arm 72 of the cup 20. The cup 20 travels on the entrance ramp 270 in which the cam surfaces 280 and 282 of the spaced-apart rails 276 and 278 taper upwardly in the direction of travel of the continuous conveyor 132. The beginning of the cam surfaces 280 and 282 are vertically lower than the free end 74 of the arm 72 and the arm 71 of the cups 20. The rods 195, disposed in a horizontal plane vertically higher than that of the free end 74, pass over the camming surface 280 of the entrance ramp 270. The ends of the rods 195 are spaced apart from the rail 229 (see FIG. 6) and the ramps 270 and 272, and thereby move beside the rail and the ramps without interference.

As the conveyor carries the cup 20 longitudinally along the side rails 276 and 278, the upwardly tapered cam surfaces 280 and 282 come into contact with the bottom sides of the arm 71 and the free end 74. The arm 71 intersects and travels on the upper cam surface 282 of the rail 278. The free end 74 of the arm 72 intersects and travels on the upper cam surface 280 of the rail 276, as best shown in FIG. 6. The cup 20 moves upward, and as the cup elevates, the ends 95 of the pivot pin 92 guide the vertical movement by traveling in the slots 60. At this point, the cup 20 rests on the arm 71 and the arm 72 independently of the chain clip 86. The cup 20 accordingly is weighed on the scale independently of the conveyor by using the lost-motion pivot pin 92 and vertical slot 60.

The conveyor 132 moves the cup 20 off the upper end of the entrance ramp 270 onto the side rails 226 and 229 of the scale 177. In this position, the weight of the cup 20 and its contents is imparted to the cam surfaces 232 and 235 of the side rails 226 and 229 by the arm 71 and the free end 74. The free end 74 slidably contacts the cam surface 232 of the side rail 226; the arm 71 slidably contacts the cam surface 235 of the side rail 229. A sensor (not illustrated) detects when the arm 71 passes onto the cam surface 235. One such sensor is a photosensor electrically connected to a controller for apparatus 119 and is carried by a flange in the weighing zone. The arm 71 momentarily breaks a beam of light emanating from a light source carried by a second flange. When the beam of light is restored, a first signal is provided the controller to indicate that a cup 20 is fully on the scale 177. Similarly, a second signal is transmitted to the controller by a second photosensor and light source positioned on flanges adjacent the end of the side rail 229. The second signal is generated when the arm 71 moves off of the cam surface 235 onto the exit ramp 272.

With the cup 20 fully on the scale 177, the weight of the cup and the article is measured. The load cell provides a signal proportional to the weight detected by the load cell for both the cup 20 and its article. An analog-to-digital converter (not shown) converts the signal corresponding to the weight of each loaded cup 20 as the cup 20 travels over the said rails 226 and 229 of the scale 177. An enabling signal from the sensor directs the controller to begin averaging the instantaneous weight signal over the time that the loaded cup 20 travels on the scale 177. The controller determines the article weight by subtracting the tare weight for the cup from the gross weight of the cup and its contents. The controller of the apparatus 119 stores the net weight of the article in each cup. The tare weight of each cup is preferably determined prior to sorting articles by cycling the cups through the scale several times. Such procedure is well known in the art.

The conveyor 132 continues moving and the cup 20 moves in sequence from the scale 177 to the exit ramp 272. The free end 74 of the arm 72 and the arm 71 of the cup 20 transfer onto the upper cam surfaces 288 and 290 of the side rails 284 and 286 which taper downwardly in the direction of travel of the continuous conveyor 132. In doing so, the support for the cup 20 switches from the free end 74 and the arm 71 back to the pivot pin 92, the chain clip 86, and the track 205. The cup 20 thereby lowers with respect to the pivot pin 92. As the cup 20 moves downwardly, the ends 95 are guided in the slots 60 to again contact the upper extent of the slots. While the cup 20 moves on the exit ramp 272, the next cup in sequence moves on the scale 177 for determining its weight as described above.

The continuous conveyor 132 carries the cup 20 and its article through the discharge zone 129 for selective discharge of the article into a group of other articles having similar characteristics. The weighing and sorting apparatus 119 illustrated in FIG. 2 includes the three separate discharge stations, 180a, 180b, and 180c in the discharge zone 129. As is known in the art, a greater or lesser number of such discharge stations may be included. Each station 180 includes the discharge mechanism 300 shown in FIG. 9. The discharge mechanism 300 mounts on the outside of the conveyors 132a and 132b and does not interfere with the rods 195 and the fabric flaps 192 between the conveyors. The controller selectively activates the solenoid 322 in the appropriate station 180 to cause a selected cup, such as the cup 20c shown in FIG. 9, to pivot and discharge its article. The article moves off of the resilient supports 47 on the rollers 35 into one of the fabric flaps 192 as it falls into the receiving area 186 above the take-away conveyor 183. The fabric flap 192 cushions the transfer of the article from the cup 20 to the take-away conveyor 183.

The pivotable bridge strut 324 is at a first position against the bridge support 302 when the solenoid 322 is not energized, as shown in phantom in FIG. 8. When an article is selected for discharge at the station 180, the shaft of the solenoid 322 rotates, as indicated by the arrows, pivoting the bridge strut 324 from its first position to its second position adjacent the entrance ramp 316 of the bridge 310. The arm 71 of the selected cup 20c, moving in a horizontal plane by the continuous conveyor 132, intersects the upwardly-tapered bridge strut 324. The arm 71 then moves upwardly along the back surface 328 of the strut 324 and onto the entrance ramp 316, and this upward movement begins to pivot the cup 20c upwardly around the pivot pin 92. As the cup 20 reaches the horizontal cam surface 318, the cup 20c reaches its maximum angle of pivot and the article supported on the rollers 35 tips from the cup onto the fabric flap 192 carried by the rod 195. The fabric flap 192 drops into the receiving area 186 above the take-away conveyor 183 cushioning the drop of the article onto the take-away conveyor from the cup 20c. The conveyor 132 continues moving and the pivoted cup 20c travels along the downwardly tapered exit ramp. This causes the cup 20c to pivot around the pivot shaft 92 from the second pivoted position back to the first horizontal position. The article rolls on the flap 192 which continues to be moved in the direction of travel for the conveyors 132. The article then rolls onto the take-away conveyor 183 in the selected discharge station 180 for grouping with other articles having similar properties.

The rotatable solenoid 322 de-energizes when the arm 71 contacts and begins moving up the entrance ramp 316. This causes the shaft of the solenoid 322 to rotate to its first position, returning the bridge strut 324 to its first position against the bridge support 302. Thereby, only the selected cup 20c travels onto the bridge 310. As discussed above, the solenoid 322 of each discharge mechanism 300 is connected to the controller. A signal proportional to the speed of travel of the conveyor 132 is fed to the controller so that the controller can determine when a cup has traveled the known distance between the weighing zone and a selected discharge zone. The selective actuation of the solenoid 322 associated with the particular discharge station 180a, 180b, or 180c, is dictated by the optical and weight characteristics detected in the property-determining zone 126 for the particular article. The cups 20 continue to move over the sprocket 147 and along the lower flight 144 for returning and receiving another article in the loading zone.

The principles, preferred embodiments and modes of operation of the present invention have been described in the foregoing specification. The invention is not to be construed as limited to the particular forms disclosed because these are regarded as illustrative, rather than restrictive. Moreover, variations and changes may be made by those skilled in the art without departing from the spirit of the invention as described by the following claims. t

What is claimed is:

1. An article-holding cup for an article sorting apparatus with at least one continuous conveyor which passes sequentially through an article loading zone in which the cup receives one article, a property-determining zone with sensors for determining at least one property of the article on the cup, and a discharge zone for selectively gathering together articles having alike properties, comprising:
   two end walls and two side walls connected together to define a rectangular tube;
   a pair of spaced-apart rollers for supporting an article thereon, each roller including an axle that mounts perpendicularly between the side walls at an upper edge of the tube for rotation;
   a pair of wheels positioned parallel to the side walls, one of the wheels attached to each axle at an end that extends outside of one of the side walls; and
   means for pivotably connecting the tube to the continuous conveyor so as to selectively discharge the article in the discharge zone, whereby the article, being rotated in response to the wheels turning as the cup is carried through the property-determining zone, exposes different surface areas to the sensors.

2. An article sorting apparatus, comprising:
   a continuous conveyor having a direction of travel in a dimension of elongation and passing in sequence through an article loading zone, a property-determining zone, and a discharge zone;
   a plurality of article carrying cups attached to said continuous conveyor, each said cup comprising:
   two end walls and two side walls connected together to define a rectangular tube;
   a pair of spaced-apart rollers for supporting an article thereon, each roller including an axle that mounts perpendicularly between the side walls at an upper edge of the tube for rotation;
   a pair of wheels positioned parallel to the side walls, one of the wheels attached to each axle at an end that extends outside of one of the side walls; and
   means for pivotally connecting the tube to the continuous conveyor so as to selectively discharge the article from the cup in the discharge zone;
   a plate in the property-determining zone disposed parallel to said direction of travel for contacting by the wheels as the cups pass thereby to rotate the rollers; and
   a scale in the property-determining zone,
   whereby the article, being rotated in response to the wheels rolling on the plate as the cup is exposed to optical property sensing means while being carried through the property-determining zone, presents different areas of its surface for determining optical properties and being weighed on the scale, for selective discharge in the discharge zone with other articles having like optical and weight properties.

3. An article weighing and sorting apparatus, comprising:
   a pair of spaced-apart, parallel continuous conveyors which pass through an article loading zone, a property-determining zone and a discharge zone;
   a plurality of cups carried by each of said conveyors for receiving an article while the cup is in the article loading zone, each cup comprising:
   two end walls and two side walls connected together to define a rectangular tube;
   a pair of spaced-apart rollers for supporting an article thereon, each roller including an axle that mounts perpendicularly between the side walls at an upper edge of the tube for rotation;
   a pair of wheels positioned parallel to the side walls, one of the wheels attached to each axle at an end that extends outside of one of the side walls;
   means for pivotably connecting the tube to one of the continuous conveyors for selective pivoting in said discharge zone toward said other carrier,
   a first support surface and a second support surface for supporting the cup on a scale in the property-determining zone, the first support surface disposed on the lower side of an arm extending laterally from a first side of the cup, the second support surface disposed at a free end of an L-shaped arm extending outward and downward from a second side of the cup, the second support surface disposed lower than the first support surface;
   means for supporting the cup solely on the support surfaces independently of the carrier during weighing of said cup;
   means for turning the wheels of the cups passing through the property-determining zone for exposing different surface areas of the article in each cup to an optical sensor in the property determining zone for determining optical characteristics of the article;
   means for pivoting a selected cup in a discharge zone to discharge the article from the cup;
   means for receiving a discharged article;
   a plurality of rods disposed perpendicularly between the two carriers, each rod connected at its respective longitudinal ends to one of the carriers, the support surface of the second member in a plane vertically lower than the rods; and
   a fabric flap attached to each rod for gently communicating an article pivoted from a selected cup to the receiving means.

4. An article-holding cup for an article sorting apparatus with at least one continuous conveyor which passes sequentially through an article loading zone in which the cup receives one article, a property-determining zone with sensors for determining at least one property of the article on the cup, and a discharge zone for selectively gathering together articles having alike properties, comprising:
   two end walls and two side walls connected together to define a rectangular tube;
   a pair of spaced-apart rollers for supporting an article thereon, each roller including an axle that mounts perpendicularly between the side walls at an upper edge of the tube for rotation;

a pair of wheels positioned parallel to the side walls, one of the wheels attached to each axle at an end that extends outside of one of the side walls;

means for supporting the tube on a scale with lost motion in the vertical direction independently of the conveyor; and means for pivotably connecting the tube to the continuous conveyor, whereby the article, being rotated in response to the wheels turning as the cup is carried through the property-determining zone, exposes different surface areas to the sensors.

5. The article-holding cup as recited in claim 4, further comprising a member disposed perpendicularly between the side walls and connected to the upper edges thereof medial the end walls.

6. The article-holding cup for an article sorting apparatus with at least one continuous conveyor which passes sequentially through an article loading zone in which the cup receives one article, a property-determining zone with sensors for determining at least one property of the article on the cup, and a discharge zone for selectively gathering together articles having alike properties, comprising:

two end walls and two side walls connected together to define a rectangular tube;

a pari of spaced-apart rollers for supporting an article thereon, each roller including an axle that mounts perpendicularly between the side walls at an upper edge of the tube for rotation:

a pair of wheels positioned parallel to the side walls, one of the wheels attached to each axle at an end that extends outside of one of the side walls;

means for supporting the tube on a scale independently of the continuous conveyor; and means for pivotably connecting the tube to the continuous conveyor, whereby the article, being rotated in response to the wheels turning as the cup is carried through the property-determining zone, exposes different surface areas to the sensors.

7. An article-holding cup for an article sorting apparatus with at least one continuous conveyor which passes sequentially through an article loading zone in which the cup receives one article, a property-determining zone with sensors for determining at least one property of the article on the cup, and a discharge zone for selectively gathering together articles having alike properties, comprising:

two end walls and two side walls connected together to define a rectangular tube;

a pair of spaced-apart rollers for supporting an article thereon, each roller including an axle that mounts perpendicularly between the side walls at an upper edge of the tube for rotation;

a pair of wheels positioned parallel to the side walls, one of the wheels attached to each axle at an end that extends outside of one of the side walls;

means for pivotably connecting the tube to the continuous conveyor; and the means for pivotably connecting comprising a pin disposed between the side walls, and a clip attached to the pin for engaging the continuous conveyor, whereby the article, being rotated in response to the wheels turning as the cup is carried through the property-determining zone, exposes different surface areas to the sensors.

8. The article-holding cup as recited in claim 7, further comprising means for supporting the tube on a scale independently of the continuous conveyor.

9. The article-holding cup as recited in claim 8, wherein the means for supporting comprises a pair of vertical elongate slots, one of which extends upward from a bottom edge of each of the end walls, the slots transversely aligned with respect to each other to receive a respective end of the pin.

10. The article sorting apparatus as recited in claim 9, further comprising means for pivoting a selected cup in the discharge zone to discharge the article from the cup.

11. The article sorting apparatus as recited in claim 9, further comprising a first support and a second support for supporting the cup on the scale, one support extending outwardly from each of the side walls at a bottom edge of the tube.

12. The article sorting apparatus as recited in claim 11, wherein the first support is a plate-like arm.

13. The article sorting apparatus as recited in claim 12, wherein the second support is a generally L-shaped arm extending outwardly and downward.

14. The article sorting apparatus as recited in claim 13, wherein the scale further comprises:

a weighing platform;

a first rail connected to a first side of the weighing platform and aligned with the first arm; and a second rail connected to a second side of the weighing platform and aligned with the lower distal surface of the L-shaped arm, the first rail taller than the second rail such that the cup sits horizontal on the scale.

15. The article sorting apparatus as recited in claim 14, further comprising:

a second continuous conveyor parallel to and spaced-apart from the first conveyor and including a plurality of the cups;

a plurality of rods disposed perpendicularly between the two conveyors, each of the rods connected at its respective longitudinal ends to one of the conveyors; and a fabric flap attached to each of the rod for gently receiving an article discharged from a selected one of the cups in the discharge zone, wherein the L-shaped arm extends downward below the horizontal plane in which the rods travel.

16. An article sorting apparatus, comprising:

a continuous conveyor having a direction of travel in a dimension of elongation and passing in sequence through an article loading zone, a property-determining zone, and a discharge zone;

a plurality of article carrying cups attached to said continuous conveyor, each said cup comprising:

two end walls and two side walls connected together to define a rectangular tube;

a pair of spaced-apart rollers for supporting an article thereon, each roller including an axle that mounts perpendicularly between the side walls at an upper edge of the tube for rotation;

a pair of wheels positioned parallel to the side walls, one of the wheels attached to each axle at an end that extends outside of one of the side walls; and means for pivotally connecting the tube to the continuous conveyor;

a plate in the property-determining zone disposed parallel to said direction of travel for contacting by the wheels as the cups pass thereby to rotate the rollers;

a scale in the property-determining zone;

means for pivoting a selected cup in the discharge zone to discharge the article from the cup; and means for determining optical properties of each said article carried through said property-determining zone, whereby the article, being rotated in response to the wheels rolling on the plate as the cup is carried through the property-determining zone, presents different areas of its surface for determining optical properties and being weighed on the scale, for selective discharge in the discharge zone with other articles having like optical and weight properties.

17. An article sorting apparatus, comprising:

a continuous conveyor having a direction of travel in a dimension of elongation and passing in sequence through an article loading zone, a property-determining zone, and a discharge zone;

a plurality of article carrying cups attached to said continuous conveyor, each said cup comprising:

two end walls and two side walls connected together to define a rectangular tube;

a pair of spaced-apart rollers for supporting an article thereon, each roller including an axle that mounts perpendicularly between the side walls at an upper edge of the tube for rotation;

a pair of wheels positioned parallel to the side walls, one of the wheels attached to each axle at an end that extends outside of one of the side walls; and means for pivotally connecting the tube to the continuous conveyor.

a plate in the property-determining zone disposed parallel to said direction of travel for contacting by the wheels as the cups pass thereby to rotate the rollers;

a scale in the property-determining zone; and a first support and a second support for supporting the cup on the scale, one support extending outwardly from each of the side walls at a bottom edge of the tube, whereby the article, being rotated in response to the wheels rolling on the plate as the cup is carried through the property-determining zone, presents different areas of its surface to means in the property-determining zone for determining optical properties of each article, and being weighed on the scale, for selective discharge in the discharge zone with other articles having like optical and weight properties.

18. An article-holding cup for an article sorting apparatus with at least one continuous conveyor which passes sequentially through an article loading zone in which the cup receives one article, a property-determining zone with sensors for determining at least one property of the article on the cup, and a discharge zone for selectively gathering together articles having alike properties, comprising:

means defining a frame;

at least one roller carried by the frame for supporting an article thereon, each roller including an axle that mounts perpendicularly to the path of the conveyor;

means for rotating the roller as the conveyor moves the frame through the property-determining zone;

means for supporting the frame on a scale independently of the continuous conveyor;

means for pivotably connecting the frame to the continuous conveyor, comprising a pin pivotably connected to the frame, and a clip attached to the pin for engaging the continuous conveyor, whereby the article is selectably ejectable from the cup.

19. The article-holding cup as recited in claim 18, wherein the means for supporting comprises:

a vertical slot in two opposing sides of the frame that extend upwardly from a lower edge for each receiving an end of the pin therein; and a pair of supports extending from the frame, the supports holding the frame on a scale in the property-determining section independently of the continuous conveyor with lost motion in the vertical direction.

* * * * *